United States Patent
Preiss et al.

(10) Patent No.: US 12,157,498 B2
(45) Date of Patent: Dec. 3, 2024

(54) ASSISTANCE FROM AUTONOMOUS VEHICLE DURING EMERGENCIES

(71) Applicant: International Business Machines Corporation, Armonk, NY (US)

(72) Inventors: Tanner Mark Preiss, Schnecksville, PA (US); Craig M. Trim, Ventura, CA (US); Jeremy R. Fox, Georgetown, TX (US); Fang Lu, Billerica, MA (US)

(73) Assignee: International Business Machines Corporation, Armonk, NY (US)

(*) Notice: Subject to any disclaimer, the term of this patent is extended or adjusted under 35 U.S.C. 154(b) by 134 days.

(21) Appl. No.: 17/469,398

(22) Filed: Sep. 8, 2021

(65) Prior Publication Data
US 2023/0073442 A1  Mar. 9, 2023

(51) Int. Cl.
| | | |
|---|---|---|
| *B60W 60/00* | (2020.01) | |
| *B60W 30/08* | (2012.01) | |
| *B60W 40/08* | (2012.01) | |
| *B60W 40/12* | (2012.01) | |
| *B60W 50/02* | (2012.01) | |
| *B60W 50/14* | (2020.01) | |
| *G07C 5/08* | (2006.01) | |

(52) U.S. Cl.
CPC ........ *B60W 60/0016* (2020.02); *B60W 30/08* (2013.01); *B60W 40/08* (2013.01); *B60W 40/12* (2013.01); *B60W 50/0205* (2013.01); *B60W 50/14* (2013.01); *G07C 5/0808* (2013.01); *B60W 2030/082* (2013.01); *B60W 2040/0818* (2013.01); *B60W 2040/0872* (2013.01); *B60W 2540/22* (2013.01); *B60W 2540/221* (2020.02)

(58) Field of Classification Search
CPC ...... B60W 60/00; B60W 30/00; B60W 40/00; B60W 50/00; B60W 2030/00; B60W 2040/00; B60W 2540/00; G07C 5/00
See application file for complete search history.

(56) References Cited

U.S. PATENT DOCUMENTS

| | | | | |
|---|---|---|---|---|
| 8,044,772 B1* | 10/2011 | Roe | .................. | B60K 28/06 |
| | | | | 340/576 |
| 9,988,055 B1* | 6/2018 | O'Flaherty | ............ | G08B 21/06 |
| 10,156,848 B1* | 12/2018 | Konrardy | ................. | G08G 1/20 |
| 10,328,853 B2* | 6/2019 | Yellambalase | ........ | B60L 3/0023 |
| 10,354,230 B1* | 7/2019 | Hanson | .................. | G07B 15/00 |

(Continued)

OTHER PUBLICATIONS

"Disability", Wikipedia, last edited on Jul. 29, 2021, 30 pages, <https://en.wikipedia.org/wiki/Disability>.

*Primary Examiner* — Andrew R Dyer
*Assistant Examiner* — Elizabeth J Slowik
(74) *Attorney, Agent, or Firm* — Monchai Chuaychoo

(57) ABSTRACT

An approach for assisting users with disabilities in an emergency situation relating to a vehicle is disclosed. The approach determines the profile of the passenger in a vehicle by noting preferences and disabilities associated with the passenger. After a vehicle accident, the approach determines the condition of the vehicle and the condition of the passenger. Based on various information received, the approach creates an action list of solutions for the passenger, wherein the action list has assigned dynamic risk scores. The approach determines the best solution based on the risk scores and selects the best solution from the action list.

20 Claims, 4 Drawing Sheets

(56) References Cited

U.S. PATENT DOCUMENTS

| | | |
|---|---|---|
| 10,493,936 B1 | 12/2019 | Konrardy |
| 10,504,306 B1 | 12/2019 | Konrardy |
| 11,017,476 B1* | 5/2021 | Gainer ................. G07C 5/0808 |
| 2006/0189885 A1* | 8/2006 | Yelland .................... A61B 5/16 |
| | | 600/558 |
| 2007/0254268 A1* | 11/2007 | Adachi ................ G09B 21/003 |
| | | 434/112 |
| 2012/0028680 A1* | 2/2012 | Breed .................... G01F 23/20 |
| | | 455/556.1 |
| 2014/0200737 A1* | 7/2014 | Lortz ..................... B60R 25/25 |
| | | 701/1 |
| 2014/0310739 A1* | 10/2014 | Ricci .................. G06Q 20/321 |
| | | 725/75 |
| 2015/0061895 A1* | 3/2015 | Ricci ..................... B60K 28/00 |
| | | 340/902 |
| 2016/0023665 A1* | 1/2016 | Sherony ................ B60W 40/09 |
| | | 701/2 |
| 2017/0180964 A1* | 6/2017 | Mehta ...................... H04W 4/90 |
| 2018/0107328 A1* | 4/2018 | Seok ........................ H05B 3/06 |
| 2019/0049969 A1 | 2/2019 | Qawami |
| 2019/0210559 A1* | 7/2019 | Krainer ................... H04W 4/44 |
| 2020/0055526 A1* | 2/2020 | Malik ..................... B61L 27/16 |
| 2020/0055530 A1* | 2/2020 | Malik ....................... B61K 1/00 |
| 2020/0334928 A1* | 10/2020 | Bourke ..................... G06N 5/04 |
| 2020/0346751 A1* | 11/2020 | Horelik .................. G05D 1/101 |
| 2021/0056866 A1* | 2/2021 | Ryu ..................... G09B 21/003 |
| 2021/0086778 A1* | 3/2021 | Suthar .................... B60Q 1/544 |
| 2021/0201683 A1* | 7/2021 | van den Berg ....... B60W 40/08 |
| 2021/0323446 A1* | 10/2021 | Christensen .......... B60R 21/013 |
| 2021/0358329 A1* | 11/2021 | Bharati ................ G01C 21/206 |
| 2022/0032956 A1* | 2/2022 | Wolff ....................... A61B 5/18 |
| 2022/0167099 A1* | 5/2022 | Feilner ................... H04R 3/005 |
| 2022/0194426 A1* | 6/2022 | Beaurepaire ........ B60W 30/085 |
| 2023/0048359 A1* | 2/2023 | Roberts ................ B60W 40/08 |

\* cited by examiner

ASSISTANCE FROM AUTONOMOUS VEHICLE DURING EMERGENCIES

BACKGROUND

The present invention relates generally to the field of transportation, and more particularly to providing emergency assistance to passengers during travel.

Self-driving cars, also known as AV (autonomous vehicle), are becoming readily available for the majority of users. These AVs can definitely provide great help in people's lives. For example, for those people who are not comfortable with driving or who has certain disabilities that cannot drive can definitely take advantage of this new technology, the AV alleviates that problem.

There are biosensors located throughout the AVs to detect the status of the driver and determine impaired-driving condition of a driver of a vehicle (e.g., falling asleep, intoxication, etc.). Some of the biosensors may be able to warn the drivers to stay awake or possibly warn other vehicles (if equipped).

SUMMARY

Aspects of the present invention disclose a computer-implemented method, a computer system and computer program product for assisting users with disabilities in an emergency relating to a vehicle. The computer implemented method may be implemented by one or more computer processors and may include, determining profile of the passenger in a vehicle; determining a condition of the vehicle after an accident; determining a condition of the passenger; creating an action list based on the condition of the vehicle and the condition of the passenger; and executing the action list.

According to another embodiment of the present invention, there is provided a computer system. The computer system comprises a processing unit; and a memory coupled to the processing unit and storing instructions thereon. The instructions, when executed by the processing unit, perform acts of the method according to the embodiment of the present invention.

According to a yet further embodiment of the present invention, there is provided a computer program product being tangibly stored on a non-transient machine-readable medium and comprising machine-executable instructions. The instructions, when executed on a device, cause the device to perform acts of the method according to the embodiment of the present invention.

BRIEF DESCRIPTION OF THE DRAWINGS

Preferred embodiments of the present invention will now be described, by way of example only, with reference to the following drawings, in which.

DETAILED DESCRIPTION

Figure 1:
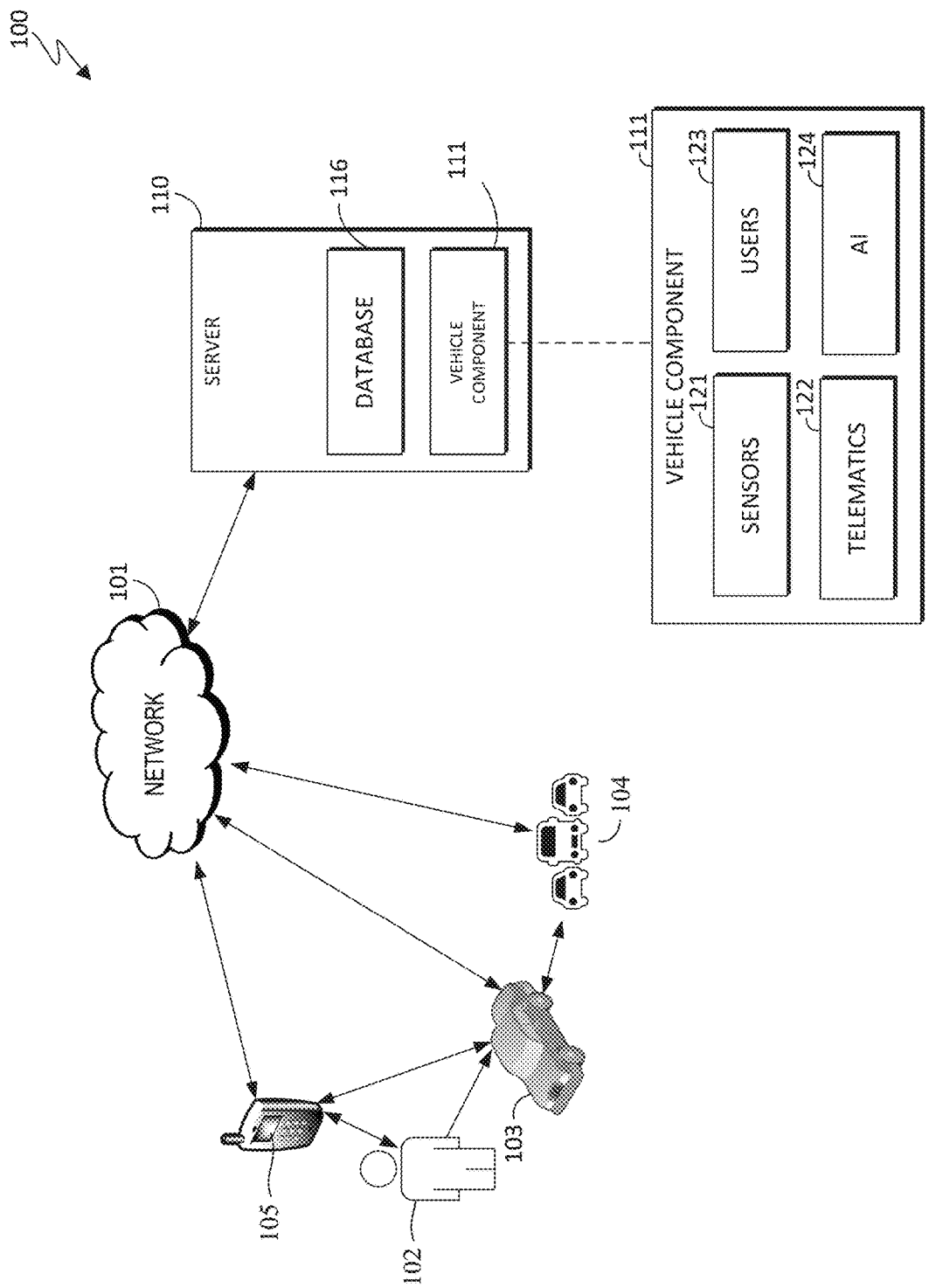
FIG. 1 is a functional block diagram illustrating a vehicle assistance environment, designated as 100, in accordance with an embodiment of the present invention.

The current state of art as it pertains to AV (autonomous vehicle)/self-driving car travel presents some challenges for users (as drivers/passengers) with disabilities. For example, if the self-driving car gets into an accident then the user may not be able to operate the car or exit from the car in time to get help. Furthermore, the current state of technology does not notify other self-driving cars (within the vicinity) about passenger/users with disability is on-board when this car is in an accident and cannot provide additional assistance to the user.

Embodiments of the present invention recognizes the deficiencies in the current state of art as it relates to assisting users with disabilities when the self-driving car they ride/travel becomes involved in an accident and provides an approach for addressing those deficiencies. One approach may consist of (i) notifying the other self-driving cars around and (ii) activating the necessary functions in the car to help the user to be rescued more easily.

In another example that can be addressed by the approach may include, (i) first responder/good Samaritan may not readily understand that some or all of the passengers of the vehicle involved in an accident have disabilities. For example, first responder arriving on the scene may not recognize that a passenger may have a hearing disability and the first responder tries to shout instructions to that passenger. However, the passenger is unable to comply with verbal instructions from the first responder. Embodiments of the present invention can provide that crucial information (i.e., through a consent of a user but can withheld actual names) to first responder along with other instruction related to the vehicle (e.g., driver side door mechanism is inoperable, etc.).

In some embodiments, another approach may comprise of, (i) establishing environmental awareness using a GPS mapping tool, (ii) in response to an emergency situation, the approach may transmit a notification to surrounding autonomous vehicles to perform an emergency precaution activity, (iii) performing a user vehicle condition assessment and a passenger condition assessment based on the emergency situation and (iv) in response to preconfigured conditions being satisfied based on the performed user vehicle condition assessment or the passenger condition assessment, the approach may perform an emergency action or transmitting an emergency notification.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described.

The terms "user", "passenger", "rider" and "driver" may be used interchangeably throughout the disclosure but will have similar meaning.

It should be understood that the Figures are merely schematic and are not drawn to scale. It should also be understood that the same reference numerals are used throughout the Figures to indicate the same or similar parts.

FIG. 1 is a functional block diagram illustrating a vehicle assistance environment, designated as 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Vehicle assistance environment 100 includes network 101, users 102, user vehicle 103, other vehicles 104, devices 105 and server 110.

Network 101 can be, for example, a telecommunications network, a local area network (LAN), a wide area network (WAN), such as the Internet, or a combination of the three, and can include wired, wireless, or fiber optic connections. Network 101 can include one or more wired and/or wireless networks that are capable of receiving and transmitting data, voice, and/or video signals, including multimedia signals that include voice, data, and video information. In general, network 101 can be any combination of connections and protocols that can support communications between server 110 and other computing devices (not shown) within Vehicle assistance environment 100. It is noted that other computing devices can include, but is not limited to, any electromechanical devices capable of carrying out a series of computing instructions.

Users 102 are drivers and/or passengers on an AV. Users may have certain physical and/or mental disabilities. Some physical disabilities can include visual and auditory impairment. Mental disabilities may include learning disabilities, etc.

User vehicle 103 are vehicle (e.g., autonomous or semi-autonomous) belonging and/or being utilized by the user (i.e., users 102). User vehicle 103 may be full self-driving vehicle (i.e., level 5) or partial driving capability (i.e., levels 1-4) as defined by the SAE (society of automotive engineers). User vehicle 103 may also contain myriad of onboard sensors (e.g., IoT devices, heart rate, microphone, etc.) that can detect vehicle telemetry and determine user cognitive state/mood.

Other vehicles 104 are vehicles (e.g., non-autonomous or fully autonomous vehicles) that are in the vicinity of user vehicle 103. These vehicles maybe involved in an accident with user vehicle 103 or are passerby of the scene of an accident involving user vehicle 103.

Devices 105 are smart devices that belongs to the passengers/users. Generally, devices 105 are electronic devices that can interface with the users to provide assistance with everyday activities. For example, devices 105 can be an auditory implant that allows a hearing impaired person to "hear" sounds. Alternatively, devices 105 can be a portable braille device that allows visually impaired users to "read" and it is coupled to an auditory earphones that provides walking navigation instructions. In other examples, devices 105 can be a smart phone, smart watch that can measure heart rate and has other biometric functionality and smart earbuds.

Server 110 can be a standalone computing device, a management server, a web server, a mobile computing device, or any other electronic device or computing system capable of receiving, sending, and processing data. In other embodiments, server 110 can represent a server computing system utilizing multiple computers as a server system, such as in a cloud computing environment. In another embodiment, server 110 can be a laptop computer, a tablet computer, a netbook computer, a personal computer (PC), a desktop computer, a personal digital assistant (PDA), a smart phone, or any other programmable electronic device capable of communicating other computing devices (not shown) within vehicle assistance environment 100 via network 101. In another embodiment, server 110 represents a computing system utilizing clustered computers and components (e.g., database server computers, application server computers, etc.) that act as a single pool of seamless resources when accessed within vehicle assistance environment 100.

Embodiment of the present invention can reside on server 110. Server 110 includes vehicle component 111 and database 116.

Vehicle component 111 provides the capability of (i) assisting users 102 during an accident, (ii) alerting/notifying other vehicles (i.e., other vehicles 104) of the accident and/or (iii) alert/notify first responders with the location of the vehicle, status of passengers (including any disabilities they may have) and status of the vehicle (i.e., vehicle is not operable).

Regarding assisting users during/after an accident, vehicle component 111 may leverage risk calculation protocol to determine the best course of action. For example, vehicle component 111 may analyze the situation after a vehicle accident and determine the best course of action for the users by generating an action list with assigned risk scores. Based on the initially generated action list, vehicle component 111 may recalculate the scores of the action list based on changing conditions (e.g., users seems more hurt than initially detected, delay due to traffic for arrival time for fire responders, etc.). Vehicle component 111 will select the best solution from the action list based on the best risk score. For example, the action list may include the following, i) passengers should remain in the vehicle, ii) contact first responders, iii) alert other vehicles to avoid the scene or iv) ask passengers to exit the vehicle. Vehicle component 111 and subcomponents will be described in greater details in a subsequent section.

Database 116 is a repository for data used by vehicle component 111. Database 116 can be implemented with any type of storage device capable of storing data and configuration files that can be accessed and utilized by server 110, such as a database server, a hard disk drive, or a flash memory. Database 116 uses one or more of a plurality of techniques known in the art to store a plurality of information. In the depicted embodiment, database 116 resides on server 110. In another embodiment, database 116 may reside elsewhere within vehicle assistance environment 100, provided that vehicle component 111 has access to database 116. Database 116 may store information associated with, but is not limited to, specifications of vehicles utilized by the user, profile of the users (including disabilities), road conditions, contact information for first responder, weather conditions, traffic patterns and specifications of other vehicles nearby scene of the accident.

Figure 2:
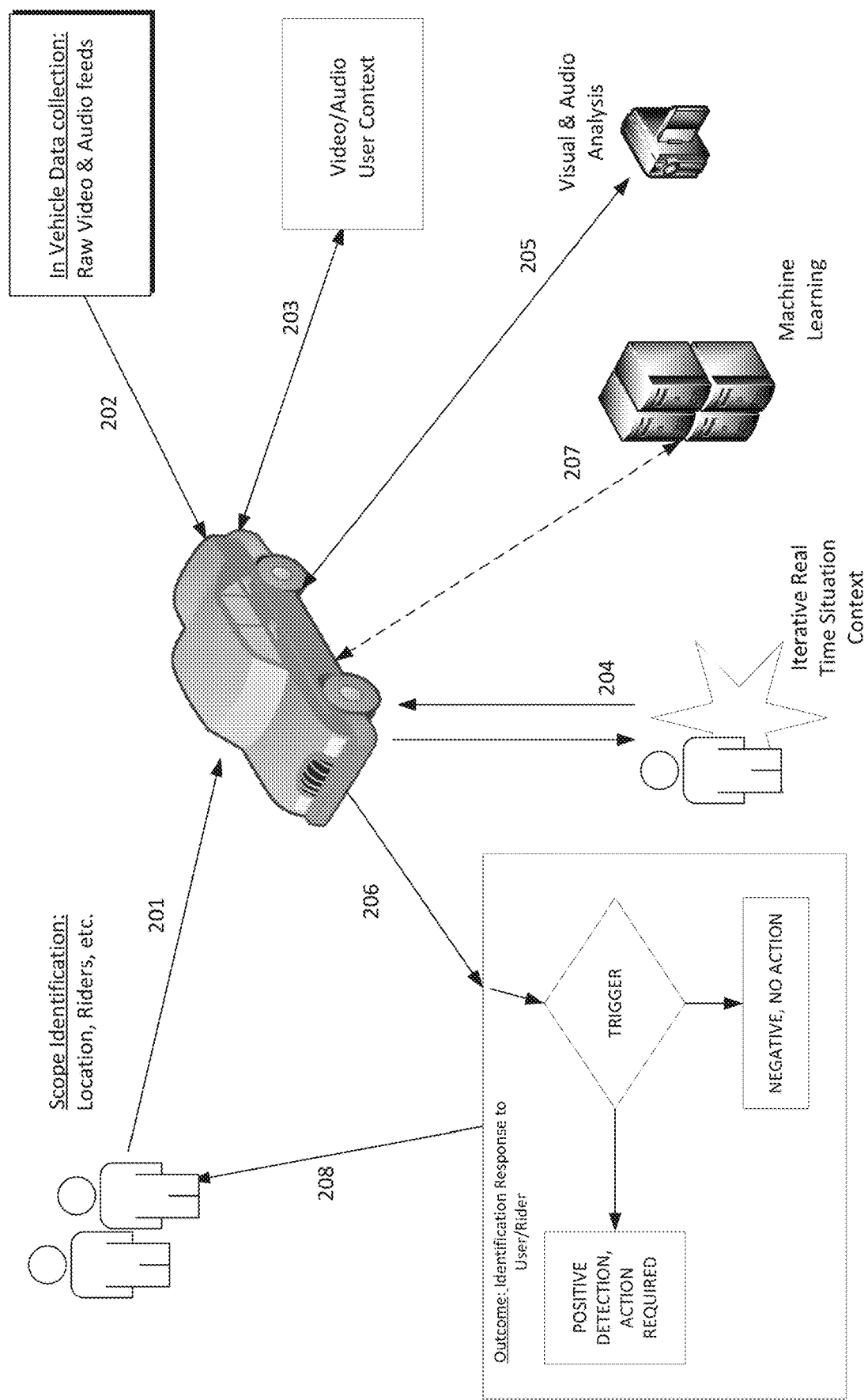
FIG. 2 is a block diagram illustrating the functionality of vehicle component 111, in accordance with an embodiment of the present invention.

FIG. 2 a block diagram illustrating the subcomponents of vehicle component 111, in accordance with an embodiment of the present invention. Vehicle component 111 contains subcomponents: sensors component 121, telematics component 122, users component 123 and AI component 124.

As is further described herein below, sensors component 121 of the present invention provides the capability of receiving information from various sensors throughout the vehicle (i.e., users vehicle 103) and receiving/sending information from devices 105 (i.e., belonging to the user). These sensors are used for the following, but it is not limited to, detect if the doors can be opened after an accident, determine if the car is still movable, determine the mental and/or physical state of the users (including other passengers in the vehicle), etc. As previously mentioned, devices 105 can be an auditory implant that allows a hearing impaired person to "hear" sounds or smartphones/wearable devices.

As is further described herein below, telematics component 122 of the present invention provides the capability of monitoring the vehicle of the users and other surrounding/nearby vehicles. Telematics component 122 can determine if the vehicle of the users is operable (before and/or after an accident) based on system diagnostic of batteries, motors, door sensors, wheels, drivetrain, etc. Telematics component 122 can determine other vehicles nearby based on GPS signal (from other user's mobile device or onboard vehicle communication system).

As is further described herein below, user component 123 of the present invention provides the capability of determining the profile of users (e.g., passengers, drivers, etc.) after they enter the vehicle (e.g., via smartwatch, object recognition, etc.). After recognizing the user has entered the vehicle, users component 123 can query database 116 to determine if the users have a disability and what type of disability (assuming the user have given permission to disclose such information and names may not be required).

Other embodiment of users component 123 can allow users to register their disabilities with the vehicle (i.e., information is locally stored on the vehicle) instead of the vehicle querying the information from a network source (e.g., medical profile, social media, etc.).

As is further described herein below, AI (artificial intelligence) component 124 of the present invention provides the capability of managing the safety of the users (i.e., users 102) after an emergency situations (i.e., vehicle accidents) based on, but it is not limited to, data from users component 123, sensors component 121 and telematics component 122.

In the same embodiment, the functionality of AI component 124 may include leveraging risk calculation protocols and calculate a dynamic risk scoring (for an action list) based on, but it is not limited to, status of vehicle after an accident, status of the passengers after an accident, status of nearby vehicles and status of nearby first responders. The risk calculation protocols can be learned/taught to the AI components 124 using any AI learning training methodology. For example, AI component 124 may calculate and assign the following dynamic scores to certain solutions from an action list after an accident, (i) ask visually disabled driver to stay in vehicle until help arrive=3 (higher number means, the higher the risk), (ii) asking the same visually disabled driver to exit the in vehicle until help arrive=80 and (iii) asking a hearing impaired driver to exit the passenger side door since the driver door is inoperable=60. The scores may change dynamically based on the changing conditions of the vehicle, weather, status of the passengers who may sustained injuries and available nearby help. Thus, AI component 124 may recalculate the scores and chose the best (least risky) solution at the time after the accident.

The risk calculation protocols will be described below by the way of examples.

Protocol Between Affected and Surrounding Vehicles

Embodiments can determine environmental awareness (outside the vehicle) by leveraging GPS applications that already provided data along a route, such as, location of a crash, vehicle on the side of the road and animal sitting.

Embodiments relies on real time autonomous risk calculation in addition to the external data from GPS applications.

The result is a calculation overlay where passing autonomous vehicles could assist in the reported event or provide evasive (i.e., advice) to surrounding autonomous vehicles. Embodiments proposes the use of a risk calculation (i.e., normally performed by self-driving vehicle) to predict and assess the need to move an affected vehicle from the lane of traffic. When such a risk is calculated, a resulting high prediction will instruct the surrounding non-affected vehicles to perform a maneuver assisting the affected vehicle out of the lane of traffic. For example, embodiment can assign a low to medium risk which will require the surrounding autonomous vehicles to perform the action.

Embodiment may instruct the surround vehicles to avoid being hit by the disabled car. For example, embodiment may instruct passing autonomous vehicles to perform blockade with warning lights enabled. Thus, this can provide greater access for emergency services/responders.

Protocol Between Affected Vehicles

Embodiments can check the affected vehicle condition by evaluate the current condition of the car for the following, i) to determine where the damage or malfunction is located, ii) is the car still movable and iii) detects whether the doors can be opened or not.

Embodiments can check on the passenger condition. In parallel, embodiment checks the profile information of the passenger/rider to determine what type of disability. Embodiment determines the environmental Awareness (inside the vehicle). This means that contextually, the vehicle needs to know the number of passenger(s) and their potential disability. This would be an opt-in profile based description that the user/passenger would allow to be shared with the vehicle without an invasion of their personal privacy or personal health information. For example, the vehicle would simply know that the user might have visual impairment and suffer from anxiety during a high stress situation.

Embodiment can check the user's vital signs and use image recognition technology to determine whether the rider has suffered injuries or not. If the user has injuries, then system may determine the extent of the injuries based on sensors (i.e., biosensors).

Embodiments send the rider's condition to the emergency medical responder's organization to get help if the rider is injured. Embodiments continue monitoring the rider's condition to ensure the rider is safe. Embodiments determine whether the rider needs to exit the car once the car stops in a safe area if it is not safe for the rider to continue staying in the car. If the rider is able to exit the car then the embodiments will open the door to let the rider out if he is capable. In the case the rider is injured, embodiments may keep the door closed until the emergency medical services arrive.

Use Case Examples

A use case examples of the operation of vehicle component 111 (via AI component 124) will be provided based on certain disabilities of a user. For example, a visually impaired user, the vehicle will issue verbal commands to the user.

For an auditory impaired user, the vehicle will issue an on-screen commands assuming the screen is working (or) push the commands to a user's screen based device like their watch, phone, or tablet with them in the vehicle. Alternatively, the vehicle push to all the users personal screens simultaneously (i.e., similar to an "amber alert" for only everyone in the vehicle).

For an auditory and visually impaired user, a braille use case device that pushes instructions to a user that have auditory and visually impairment disabilities.

For users with mentally disability, (i.e., the user is very slow to follow directions), the vehicle may need to repeat or rephrase the same set of instructions many time to ensure that the mentally disabled user understands what to do and keeps being reminded of what to do until they complete the task at hand.

It is noted that this is not an all-encompassing list of disabilities listed here, but the embodiment has the ability to help users with other disabilities (mental and/or physical) not listed in the user case above. Additionally, risk scores can be calculated and assigned based on the disability of the users as well.

Otherwise, vehicle component 111 (via AI component 124) can provide contextual instructions. For example, the instructions must be given with context, such as current user location in the vehicle (i.e., can be determined via in vehicle video image recognition) and then determine how they need to exit the vehicle (i.e., "turn to your right and proceed 3 feet out the right passenger side rear door for a clear exit path").

FIG. 2 is a block diagram illustrating the functionality of vehicle component 111, in accordance with another embodiment of the present invention. The arrows with numbers denotes steps (in sequential order) of interaction between block systems in the Figure. Arrow 201 illustrates data being collected by the AV to determine the various information (i.e., scope identification) related to the users such as seat position, age, disability, etc. Arrow 202 illustrate the raw data (i.e., in-vehicle data collection) being collected by video and audio feeds (from sensors). Arrow 203 provides the means to communicate to the users such as a braille device or tablet with large fonts for auditory challenged users. Arrow 204 illustrates iterative situation context that occurs during/after an emergency event (i.e., accidents). Arrow 205 illustrates the use of visual and audio analysis to compare the initial data and post-accident data to determine the status of the vehicle and/or the passenger/users. Analysis may leverage image scoring methodology to determine the difference in status of the passenger and/or vehicle. Arrow 206 illustrates the outcome of the analysis from the prior steps on what happens after an emergency situation. Either an action is required, or no action is taken by vehicle component 111. Arrow 207 illustrates the use of an AI (i.e., machine learning) component to aid with decision making wherein the decision (arrow 208) is relied to the users/passengers of the vehicle.

Figure 3:
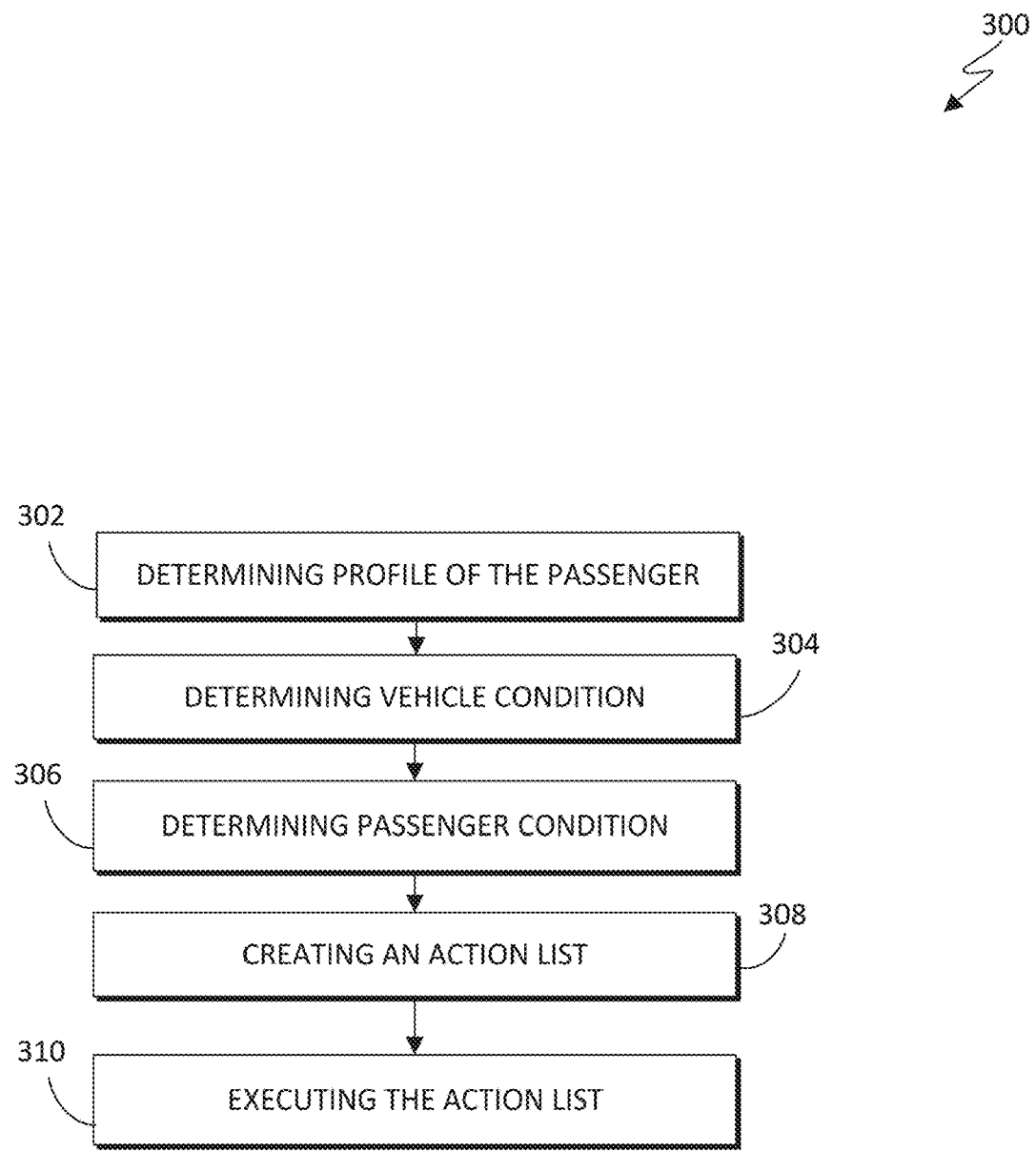
FIG. 3 is a high-level flowchart illustrating the operation of vehicle component 111, designated as 300, in accordance with an embodiment of the present invention.

FIG. 3 is a high-level flowchart illustrating the operation of vehicle component 111, designated as process 300, in accordance with another embodiment of the present invention.

Vehicle component 111 determines profile of the passenger (step 302). In an embodiment, vehicle component 111, through users component 123 and sensors component 121, can determine whether the passenger has disabilities as they enter vehicle. For example, userA, has a hearing impairment and enters a vehicle to drive to his work. UserA has registered his disability with the vehicle at the initial time (i.e., created a user profile) when the car was purchased. Vehicle recognizes (via camera, sensors, etc.) that userA has enter the car and retrieves the profile of userA.

Vehicle component 111 determines vehicle condition (step 304). In an embodiment, vehicle component 111, through telematics component 122 and sensors component 121, determines the conditions of the vehicle after an accident. For example, continuing using userA as an example, the vehicle of userA became involved in a multiple vehicle collision on the highway. Vehicle component 111 has determined that the front collision has made the driver side door of the vehicle inoperable for userA.

Vehicle component 111 determines passenger condition (step 306). In an embodiment, vehicle component 111, through sensors component 121, determines the condition of the passenger after the accident. For example, continuing using userA as an example, userA does not appear to have suffer any serious injuries based on sensors component 121.

Vehicle component 111 creates an action list (step 308). In an embodiment, vehicle component 111, through AI component 124, creates an action list corresponding to possible solutions along with the scores (using a risk scoring methodology). The action list may be based on, but it is not limited to, status of vehicle after an accident, status of the passengers after an accident, status of nearby vehicles and status of nearby first responders. For example, continuing using userA as an example vehicle component 111 creates an action list containing the following: (i) instructs the user to stay in the vehicle but move to the passenger side—score 40, (ii) instructs the user to exit via the passenger side door and standby for help—score 50 and (iii) instructs nearby first responder to rescue the user from vehicle but the driver side door is inoperable and the passenger has an auditory impairment—score 20.

Vehicle component 111 executes the action list (step 310). In an embodiment, vehicle component 111, through AI component 124, selects the best solution from the action list and follows through with the action. For example, continuing using userA as an example, vehicle component 111 selects option (iii) from the action list, where the passenger is instructed to stay in the current location (driver side) and wait for first responder to arrive and begins to relay the instruction to the user via the screen of the vehicle (userA cannot hear any verbal instructions/messages) and the screen of the mobile device of userA (i.e., devices 105).

Figure 4:
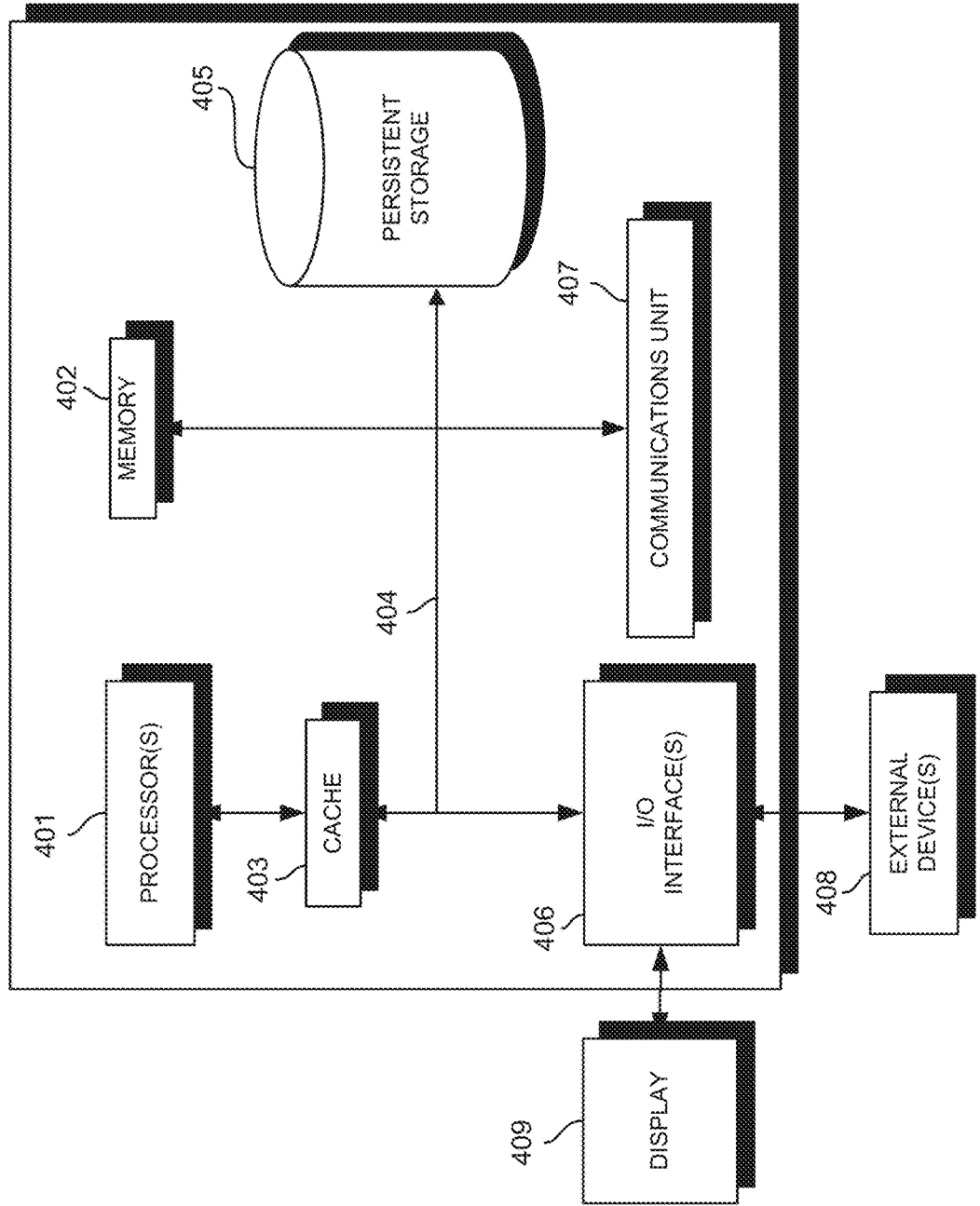
FIG. 4 depicts a block diagram, designated as 400, of components of a server computer capable of executing the vehicle component 111 within the vehicle assistance environment, of FIG. 1, in accordance with an embodiment of the present invention.

FIG. 4, designated as 400, depicts a block diagram of components of vehicle component 111 application, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

FIG. 4 includes processor(s) 401, cache 403, memory 402, persistent storage 405, communications unit 407, input/output (I/O) interface(s) 406, and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402.

Program instructions and data (e.g., software and data x10) used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Vehicle component 111 can be stored in persistent storage 405 for access and/or execution by one or more of the respective processor(s) 401 via cache 403.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data (e.g., vehicle component 111) used to practice embodiments of the present invention may be downloaded to persistent storage 405 through communications unit 407.

I/O interface(s) 406 allows for input and output of data with other devices that may be connected to each computer system. For example, I/O interface(s) 406 may provide a connection to external device(s) 408, such as a keyboard, a keypad, a touch screen, and/or some other suitable input device. External device(s) 408 can also include portable computer readable storage media, such as, for example, thumb drives, portable optical or magnetic disks, and memory cards. Program instructions and data (e.g., vehicle component 111) used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for assisting passenger with disabilities in an emergency situation relating to an autonomous vehicle, the computer-method comprising:
    determining profile of the passenger in the autonomous vehicle, wherein each of the passenger has disabilities consisting only of a visual impairment;
    registering the profile along with the disabilities to the autonomous vehicle;
    determining a condition of the autonomous vehicle after an accident;
    determining a condition of the passenger;
    retrieving the profile from the autonomous vehicle instead of smart devices;
    retrieving location of surrounding vehicles, animal and nearby vehicles;
    creating an action list based on the condition of the autonomous vehicle and the condition of the passenger, wherein creating the action list further comprises:
        generating possible solutions to assist passengers based on each selection consisting only of, status of autonomous vehicle after an accident, status of the passengers after an accident, status of the nearby vehicles and status of nearby first responders; and
        calculating, in real time, a dynamic risk score using a risk scoring methodology and assigning the dynamic risk scores to the possible solutions, wherein the risk scoring methodology assigns a numerical value to each of the possible solutions;
        instructing the surrounding vehicles to evade the autonomous vehicle after the accident;
    executing the action list, by utilizing the smart devices belonging to the passenger with disabilities and onboard devices in the autonomous vehicle, wherein the smart devices and the onboard devices are designed for use by the passengers with disabilities and instructing the passenger by using braille capable device; and
    communicating to a first responder the profile of the passenger and allowing the first responder to effectively rescue the passenger based on the disabilities of the passenger.

2. The computer-implemented method of claim 1, wherein calculating the dynamic risk score is based on image scoring methodology.

3. The computer-implemented method of claim 1, wherein determining profile of the passenger in the autonomous vehicle further comprises:
    retrieving the profile of the passenger, wherein the profile of the passenger comprises of disabilities; and
    matching the passenger with the profile of the passenger.

4. The computer-implemented method of claim 1 wherein determining a condition of the autonomous vehicle further comprises:
    running a diagnostic on a telematics system of the autonomous vehicle; and
    retrieving information from sensors on the autonomous vehicle.

5. The computer-implemented method of claim 1, wherein determining a condition of the passenger further comprises:
    retrieving information from sensors on the autonomous vehicle;
    retrieving information from wearable devices of the passenger; and
    determining the condition of the passenger by leveraging image analysis of the passenger before the accident and after the accident.

6. The computer-implemented method of claim 1, further comprising:
    recalculating the dynamic risk scores based on changing conditions of, the status of autonomous vehicle after an accident, the status of the passengers after an accident, the status of the nearby vehicles and the status of nearby first responders.

7. The computer-implemented method of claim 1 wherein the action list further comprises of, instructing passengers to stay seated, instructing passengers to exit the autonomous vehicle through a certain location, instructing first responders to a location of the autonomous vehicle and instructing other nearby vehicle to avoid an area of the accident.

8. A computer program product for assisting passenger with disabilities in an emergency situation relating to an autonomous vehicle, the computer program product comprising:
  one or more non-transitory computer readable storage media and program instructions stored on the one or more computer readable storage media, the program instructions comprising:
    program instructions to determine profile of the passenger in the autonomous vehicle, wherein each of the passenger has disabilities consisting only of a visual impairment;
    program instructions to register the profile along with the disabilities to the autonomous vehicle;
    program instructions to determine a condition of the autonomous vehicle after an accident;
    program instructions to determine a condition of the passenger;
    program instructions to retrieve the profile from the autonomous vehicle instead of smart devices;
    program instructions to retrieve location of surrounding vehicles, animal and nearby vehicles;
  program instructions to create an action list based on the condition of the autonomous vehicle and the condition of the passenger, wherein creating the action list further comprises:
    generating possible solutions to assist passengers based on each selection consisting only of, status of autonomous vehicle after an accident, status of the passengers after an accident, status of the nearby vehicles and status of nearby first responders; and
    calculating, in real time, a dynamic risk score using a risk scoring methodology and assigning the dynamic risk scores to the possible solutions, wherein the risk scoring methodology assigns a numerical value to each of the possible solutions;
    program instructions to instruct the surrounding vehicles to evade the autonomous vehicle after the accident;
    program instructions to execute the action list, by utilizing the smart devices belonging to the passenger with disabilities and onboard devices in the autonomous vehicle, wherein the smart devices and the onboard devices are designed for use by the passengers with disabilities and instructing the passenger by using braille capable device; and
    program instructions to communicate to a first responder the profile of the passenger and allowing the first responder to effectively rescue the passenger based on the disabilities of the passenger.

9. The computer program product of claim 8, wherein calculating the dynamic risk score is based on image scoring methodology.

10. The computer program product of claim 8, wherein determining profile of the autonomous passenger in a vehicle further comprises:
  program instructions to retrieve the profile of the passenger, wherein the profile of the passenger comprises of disabilities; and
  program instructions to match the passenger with the profile of the passenger.

11. The computer program product of claim 8, wherein determining a condition of the autonomous vehicle further comprises:
  program instructions to run a diagnostic on a telematics system of the autonomous vehicle; and
  program instructions to retrieve information from sensors on the autonomous vehicle.

12. The computer program product of claim 8, wherein determining a condition of the passenger further comprises:
  program instructions to retrieve information from sensors on the autonomous vehicle; and
  program instructions to retrieve information from wearable devices of the passenger.

13. The computer program product of claim 8, further comprising:
  recalculating the dynamic risk scores based on changing conditions of, the status of autonomous vehicle after an accident, the status of the passengers after an accident, the status of the nearby vehicles and the status of nearby first responders.

14. The computer program product of claim 8, wherein the action list further comprises of, instructing passengers to stay seated, instructing passengers to exit the autonomous vehicle through a certain location, instructing first responders to a location of the autonomous vehicle and instructing other nearby vehicle to avoid an area of the accident.

15. A computer system for assisting passenger with disabilities in an emergency situation relating to an the autonomous vehicle, the computer system comprising:
  one or more computer processors;
  one or more non-transitory computer readable storage media; and
  program instructions stored on the one or more computer readable storage media for execution by at least one of the one or more computer processors, the program instructions comprising:
    program instructions to determine profile of the passenger in the autonomous vehicle, wherein each of the passenger has disabilities consisting only of a visual impairment;
    program instructions to register the profile along with the disabilities to the autonomous vehicle;
    program instructions to determine a condition of the autonomous vehicle after an accident;
    program instructions to determine a condition of the passenger;
    program instructions to retrieve the profile from the autonomous vehicle instead of smart devices;
    program instructions to retrieve location of surrounding vehicles, animal and nearby vehicles;
  program instructions to create an action list based on the condition of the autonomous vehicle and the condition of the passenger, wherein creating the action list further comprises:
    generating possible solutions to assist passengers based on each selection consisting only of, status of autonomous vehicle after an accident, status of the passengers after an accident, status of the nearby vehicles and status of nearby first responders; and
    calculating, in real time, a dynamic risk score using a risk scoring methodology and assigning the dynamic risk scores to the possible solutions, wherein the risk scoring methodology assigns a numerical value to each of the possible solutions;

program instructions to instruct the surrounding vehicles to evade the autonomous vehicle after the accident;

program instructions to execute the action list, by utilizing the smart devices belonging to the passenger with disabilities and onboard devices in the autonomous vehicle, wherein the smart devices and the onboard devices are designed for use by the passengers with disabilities and instructing the passenger by using braille capable device; and program instructions to communicate to a first responder the profile of the passenger and allowing the first responder to effectively rescue the passenger based on the disabilities of the passenger.

16. The computer system of claim 15, wherein calculating the dynamic risk score is based on image scoring methodology.

17. The computer system of claim 15, wherein determining profile of the passenger in the autonomous vehicle further comprises:

program instructions to retrieve the profile of the passenger, wherein the profile of the passenger comprises of disabilities; and program instructions to match the passenger with the profile of the passenger.

18. The computer system of claim 15, wherein determining a condition of the autonomous vehicle further comprises:

program instructions to run a diagnostic on a telematics system of the autonomous vehicle; and program instructions to retrieve information from sensors on the autonomous vehicle.

19. The computer system of claim 15, wherein determining a condition of the passenger further comprises:

program instructions to retrieve information from sensors on the autonomous vehicle; and program instructions to retrieve information from wearable devices of the passenger.

20. The computer system of claim 15, further comprising:

recalculating the dynamic risk scores based on changing conditions of, the status of the autonomous vehicle after an accident, the status of the passengers after an accident, the status of the nearby vehicles and the status of nearby first responders.

* * * * *